Patented Oct. 10, 1950

2,525,280

UNITED STATES PATENT OFFICE 2,525,280

ALUMINUM PASTE PIGMENT

Everett R. Allen, Jersey City, N. J., assignor to Metals Disintegrating Company, Inc., Elizabeth, N. J., a corporation of New Jersey No Drawing. Application September 27, 1946, Serial No. 699,630

3 Claims. (Cl. 106—290)

This invention relates to improvements in metallic paste pigments of the kind known to the art as aluminum paste pigment. Such a paste pigment is adapted to be added to a varnish or other vehicle to form paint, inks and similar products. As manufactured, the aluminum paste consists essentially of flakes of aluminum metal, i. e. of aluminum or aluminum base alloy, pasted or mixed with a suitable liquid phase such as mineral spirits or other vehicle. The metal flakes usually represent at least 50 percent by weight of the paste and sometimes form as much as 90 percent by weight of the total paste. The paste likewise contains a leafing agent. Leafing agents are well known both in composition and function. In most commercial pastes the leafing agent is a fatty acid, stearic acid being presently widely used. Such leafing agents are considered as being associated with the surfaces of the metal flakes. In any event, the agent imparts to the flakes the property of "leafing," i. e. forming a layer of metallic pigment on the surface of the vehicle with which the paste is thoroughly mixed. Sometimes an excess of leafing agent, over that necessary to promote leafing, is furnished in the paste to impart a greater resistance to deterioration in storage. These aluminum paste pigments may be, and are, made in various ways, some processes of manufacture producing a better paste than others, but all producing a product such as just described.

All such pastes, to greater or lesser extent, tend to deteriorate when stored for relatively long periods under normal conditions. If stored under conditions where the temperature is excessive or where moist air may come in contact therewith the deterioration is more rapid. The deterioration above referred to is physically measured in terms of loss of leafing power. Since the propensity of the flake to leaf in the paint vehicle is the basic determinate of the brilliance and covering power of paint compositions made from such pastes, any deterioration varies the quality of the final paint product.

The problem of deterioration just outlined is the problem to the solution of which this invention is directed. It is the object of this invention to so modify the composition of the aluminum paste pigments above described as to inhibit or diminish deterioration of leafing power during storage. Another object is to provide aluminum pastes which are uniform in their resistance to deterioration, this object being desirable to the production of pastes having predictable reaction to standard storage conditions. A further object of the invention is the provision of methods of improving the resistance to deterioration of aluminum paste pigments.

The invention consists in improving the power of aluminum paste pigments to resist deterioration by the addition thereto of an aliphatic amide represented by the formula $C_nH_{2n+1}-CONH_2$ where $n$ is not less than 13 nor greater than 20. The presence of these amides in a paste of this character preserves the power of the paste to retain leafing capacity during storage. These amides are not leafing agents, their action being protective rather than formative, but they do not have a substantial effect upon other useful properties of a paste in which they are incorporated. The beneficial effects of these amides are of practical significance when the amount thereof incorporated in the paste is as small as 0.2 percent of the weight of the metal content of the paste. Very substantial amounts of the amide may be present in the paste, but amounts above 5 percent of the weight of the metal content of the paste are merely excessive and confer no additional advantages not secured by the use of lesser amounts. Within the range of about 0.2 to 5 percent the defined amides are sufficiently soluble in the substances, such as mineral spirits, turpene and aromatic hydrocarbons, esters, etc., which usually form, or are a major component of, the liquid phase of the paste. Where solubility of an amide under these conditions is limited the addition of substantially excess of the limit of solubility does not increase the beneficial effect.

The defined amides may be incorporated in the paste, simple mixing will suffice, at any convenient stage of manufacture or when manufacture is other wise complete. The stage or manner of incorporation forms no part of this invention. Pastes containing these amides, when mixed with a vehicle, form paints of superior quality since their leafing capacity over extended periods is definitely improved.

Exemplary of the advantages of the improved paste product of this invention are the results obtained in a series of tests made on paste samples selected from the same batch of a standard aluminum paste pigment containing 65 percent by weight of aluminum flake, the balance being mineral spirits and 2 percent, of the metal weight of the paste, of stearic acid. Various of the defined amides were incorporated in these samples. The thus prepared samples, and also a sample containing no amide, were each placed, together with moisture, in a metal container and stored for 10 weeks at 45 degrees centigrade. The manner of preparation of the samples was exactly that stated in paragraph 8 of Standard D-480-44 of "A. S. T. M. Standards" for 1944 (Part II), published by the American Society for Testing Materials. At termination of the storage the samples were tested for leafing power in accordance with the procedures outlined in paragraph 4 of the aforesaid Standard D-480-44. The results obtained were as follows:

| Amide incorporated in paste sample (percentages in weight of the total metal content of the paste) | Loss in Leafing Capacity |
|---|---|
| | Per cent |
| None | 28 |
| 1% Tetradecane amide | 19 |
| 1% Hexadecane amide | 12 |
| 1% Octadecane amide | 8 |

A similar sample, similarly prepared, stored and tested and containing 1% of an aliphatic amide, octane amide, not corresponding to the formula above set forth, showed a total loss of leafing capacity.

Having thus described my invention, I claim:

1. An aluminum paste pigment having improved resistance to deterioration of leafing power and comprising aluminum flakes, a liquid hydrocarbon phase and a leafing agent and containing at least about 0.2 to about 5 per cent, of the weight of said metal flakes, of an aliphatic amide represented by the formula $$C_nH_{2n+1}\text{—}CONH_2$$

where $n$ is not less than 13 nor greater than 20, said liquid hydrocarbon phase being a solvent for said amide.

2. An aluminum paste pigment having improved resistance to deterioration of leafing power and comprising aluminum flakes, a liquid hydrocarbon phase and a leafing agent and containing at least about 0.2 to about 5 per cent, of the weight of said metal flakes, of an aliphatic amide represented by the formula $$C_nH_{2n+1}\text{—}CONH_2$$

where $n$ is not less than 13 nor greater than 20, said liquid hydrocarbon phase containing a solvent for said amide, said paste being more uniform in resistance to deterioration than the same paste not containing said amide.

3. An aluminum paste pigment having improved resistance to deterioration of leafing power and comprising aluminum flakes, a liquid hydrocarbon phase and a leafing agent and containing at least about 0.2 per cent, of the weight of said metal flakes, of an aliphatic amide represented by the formula $C_nH_{2n+1}\text{—}CONH_2$ where $n$ is not less than 13 nor greater than 20, said liquid hydrocarbon phase being a solvent for said amide.

EVERETT R. ALLEN.

No references listed.